MONITOR CIRCUIT FOR FREQUENCY SHIFT TELEGRAPH SIGNALING

Filed Nov. 7, 1961 4 Sheets-Sheet 1

INVENTOR
C. J. VOTAW
BY
P C Lipton
ATTORNEY

March 9, 1965 C. J. VOTAW 3,172,953

MONITOR CIRCUIT FOR FREQUENCY SHIFT TELEGRAPH SIGNALING

Filed Nov. 7, 1961 4 Sheets-Sheet 2

INVENTOR
C. J. VOTAW
BY R C Lipton
ATTORNEY

March 9, 1965 C. J. VOTAW 3,172,953

MONITOR CIRCUIT FOR FREQUENCY SHIFT TELEGRAPH SIGNALING

Filed Nov. 7, 1961 4 Sheets-Sheet 3

INVENTOR
C. J. VOTAW
BY
R C Lipton
ATTORNEY

INVENTOR
C. J. VOTAW
BY Rc Lipton
ATTORNEY 3,172,953
MONITOR CIRCUIT FOR FREQUENCY SHIFT TELEGRAPH SIGNALING Clarence J. Votaw, Bergenfield, N.J., assignor to Bell Telephone Laboratories, Incorporated, New York, N.Y., a corporation of New York Filed Nov. 7, 1961, Ser. No. 150,711
7 Claims. (Cl. 178—88)

Figure 1:
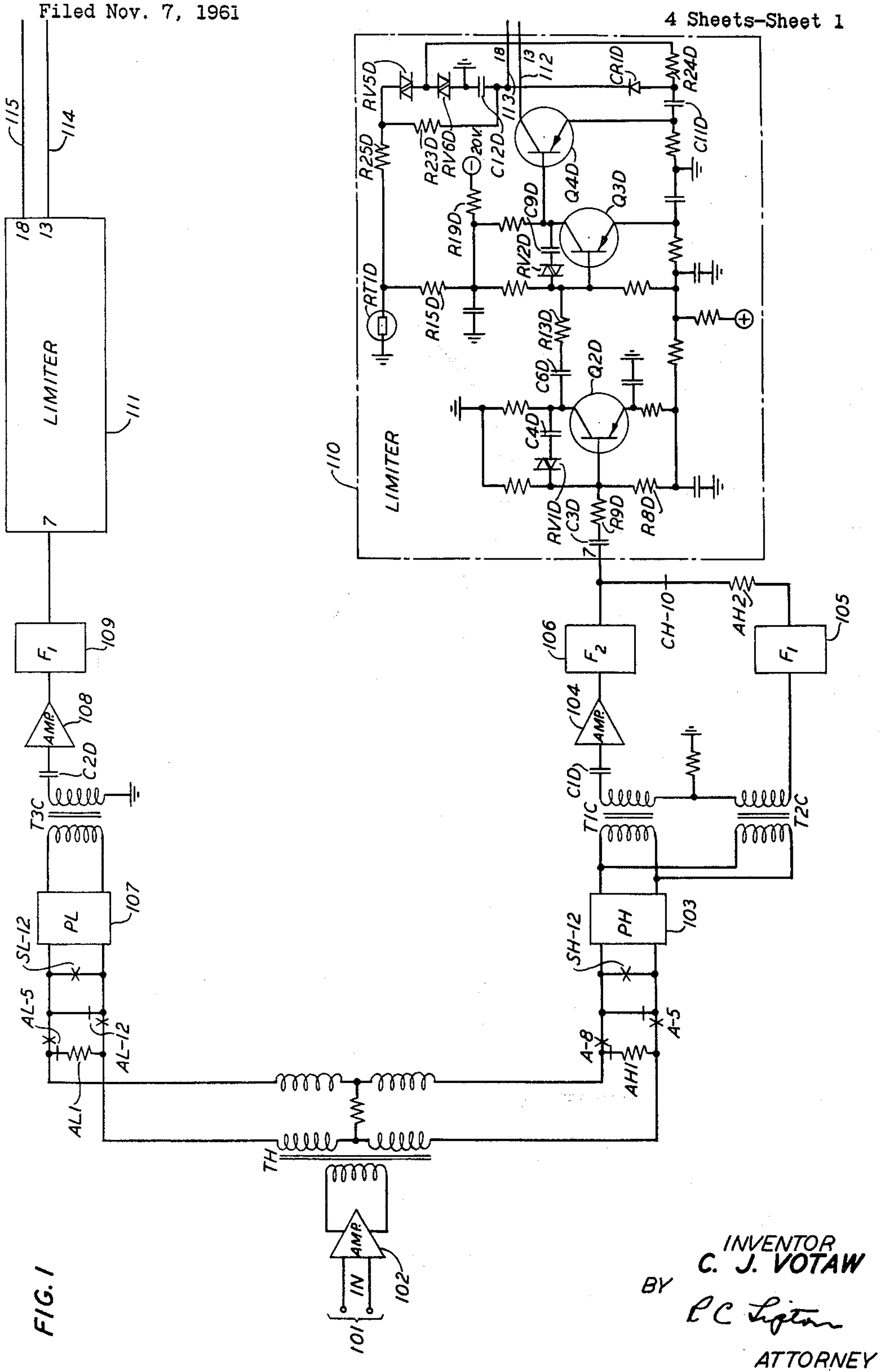

This invention relates to signal monitoring circuits and more particularly to an arrangement for providing a record of the frequency-shift data signals transmitted by two intercommunicating data transmission sets in separate subchannel frequency bands.

A broad object of this invention is to monitor signals in a first and second subchannel.

Another object of this invention is to recognize the interchange of signals between two data transmission sets that complete an interconnection.

In the copending application of T. L. Doktor, G. Parker, L. A. Weber and H. M. Zydney, Serial No. 141,672, filed September 29, 1961, which issued as Patent 3,113,176 on December 3, 1963, there is disclosed a subscriber data set connected to the telephone switching network and functioning to convert incoming frequency shift signals to direct current telegraph signals. A call is originated by a subscriber in substantially the same manner as a telephone subscriber places a call whereby the subscriber line is placed in the off-hook condition, dial tone is received from the telephone central office, and the subscriber dials the digits of the desired remote subscriber whereby the call is processed through to the called subscriber and the called subscriber's line is rung. In addition, upon the initiation of the call, the calling subscriber's subset is placed in the calling or originating mode whereby the subset transmits frequency-shift signals in a first voice frequency band, hereinafter designated the $F_1$ frequency band, and detects signals in a second frequency band, hereinafter designated the $F_2$ frequency band. At the called station when the line is rung the subset is placed in the answer, or terminating mode to transmit signals in the $F_2$ band and receive signals in the $F_1$ band. In addition, the called subset initiates the connect sequence by first providing a one-second guard interval of no signal transmission followed by the transmission of a marking signal in the $F_2$ frequency band. At the originating station a marking signal in the $F_1$ frequency band is returned after one second of continuous reception of the marking signal in the $F_2$ frequency band and the subset is placed in a condition to communicate with the remote subscriber. Similarly, the remote subscriber set is conditioned for communication one second after the reception of the marking signal in the $F_1$ frequency band. To disconnect, either station may send a one-second spacing disconnect signal and the other station responds thereto by returning a one-second spacing signal.

Another object of this invention is to discriminate between supervisory signals provided during the placing of a call and the subsequent interchange of data message signals.

Another object of this invention is to enable a monitoring circuit in response to a predetermined sequence of supervisory signals.

An additional object of this invention is to sequentially render a signal discriminator responsive to signals in separate frequency bands.

In accordance with the present invention, a first and second data set monitor circuit is provided to individually detect signals transmitted by the terminating and originating subscriber stations, respectively. A monitor line, bridged across the subscriber line, is initially extended to the first monitor circuit. A logic circuit initially arranges the first monitor circuit detector to respond to signals in both frequency bands, which signals may include ringing, dialing or high-level noise within the frequency range. Upon detection of such signals, the logic circuit then switches the arrangement of the detector to render it responsive to the connect sequence marking signal from the terminating station. In addition thereto, the logic circuit switches in a guard circuit responsive to signals in the originating station signalling channel to block the detector in the event that a call is in progress when the monitor circuit operation is initiated. Upon the reception of the connect signal, the logic circuit removes the guard circuit permitting monitoring of signals from the terminating station and further extends the monitor line to the second monitor circuit to detect signals from the originating station. At the conclusion of the call, the disconnect signal is detected to restore the monitor circuits to the initial condition.

Figures 4, 5:
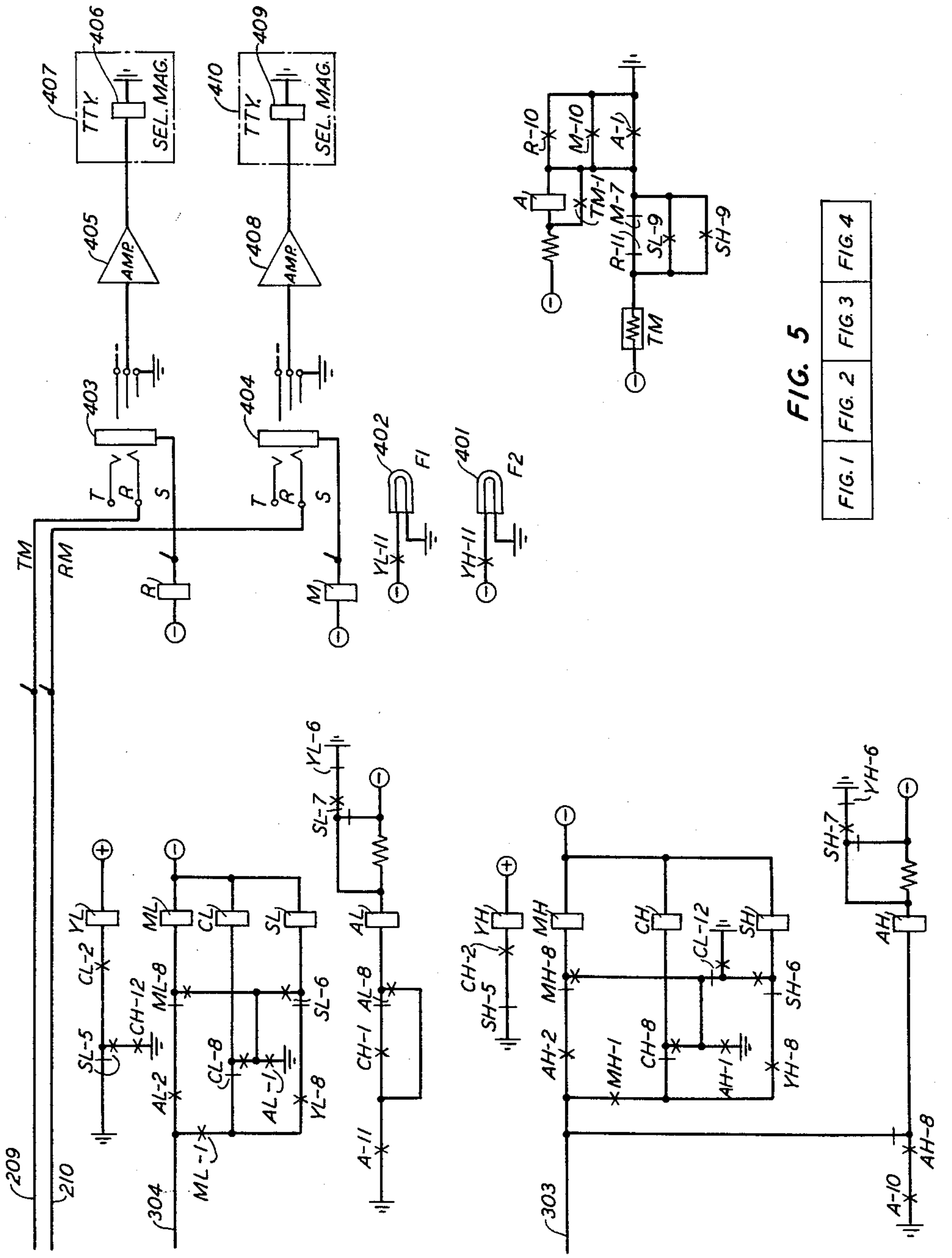

The means for fullfilling the foregoing objects and the practical embodiment of the features of this invention will be fully understood from the following description taken in conjunction with the accompanying drawing wherein:

FIGS. 1 through 4, when arranged as shown in FIG. 5, illustrate the details of the circuits and equipment which cooperated to form a monitor circuit in accordance with the present invention.

In the drawing, the relay contacts are shown detached from the relay windings. The relay winding is given an appropriate designation and the contacts associated with the relay winding are given the same designation together with a contact number. Contacts which are closed when the relay is de-energized, known as "break contacts," are represented by a single short line perpendicular to the conductor line, while contacts which are closed when the relay is energized, known as "make contacts," are represented by two short, crossed lines diagonally intersecting the conductor line.

Referring now to FIG. 1, incoming signals are applied across telephone line 101. These signals pass through amplifier 102 and are then applied across hybrid TH. Telephone line 101 is suitably bridged across the line circuit of the subscriber data set.

The signal entering hybrid TH is split equally with half of the energy passing through resistor AH1 and the other half passing through resistor AL1. Assuming relay A is operated, as described hereinafter, shunting resistor AH1 is removed by opening break contacts A–8 and the signal previously applied across resistor AH1 enters pad 103 through the make contacts of contacts A–5 and contacts A–8 and is then sent in parallel to the input of transformer T1C and transformer T2C. It is noted that pad 103 passes all frequencies and introduces a loss simulating the level of signals being received by a remote subscriber station.

The signal presented to the primary winding of transformer T2C is passed through the transformer to filter 105. Filter 105 is a conventional filter with functions to pass the frequencies in the $F_1$ frequency band. The output of filter 105 is then passed to input terminal 7 of limiter 110 by way of break contacts CH–10.

The signal presented to the primary winding of transformer T1C is passed through capacitor C1D and buffer amplifier 104 to filter 106. Filter 106, which is arranged to pass frequencies in the $F_2$ frequency band is, in turn, connected to input terminal 7 of limiter 110. Thus, with relay CH released, signals in both the $F_1$ and $F_2$ frequency bands are applied to limiter 110.

When relay AL is operated, as subsequently described, break contacts AL–5 open, removing resistor AL1, and the signal previously applied across resistor AL1 is presented to pad 107 through the make contacts of contacts AL–5 and contacts AL–12. The output of pad 107 is connected to transformer T3C whereby the signals then proceed through capacitor C2D and buffer amplifier 108 to the input of filter 109. Filter 109, which is arranged to pass frequencies in the $F_1$ frequency band is, in turn, connected to input terminal 7 of limiter 111, which limiter is arranged in the same manner as limiter 110.

The signals fed to input terminal 7 of limiter 110 are passed through capacitor C3D and resistor R9D to the base of the first transistor Q2D of the limiter. Transistor Q2D limits by virtue of the alternating current feedback connection from the collector to the base through capacitor C4D and varistor RV1D, which varistor may suitably comprise two reversely poled diodes in parallel. When the peak to peak output at the collector of transistor Q2D exceeds the threshold of varistor RV1D, the varistor conducts, causing negative feedback to reduce the gain of the stage. Thus, any signal which exceeds a predetermined amplitude will be limited by the action of this feedback circuit. The output from the collector of transistor Q2D is fed through capacitor C6D and resistor R13D to the base of transistor Q3D which is the second limiter stage.

The operation and arrangement of transistor Q3D is substantially identical to that of transistor Q2D. The feedback path of transistor Q3D is shown comprising varistor RV2D and capacitor C9D in series. It is understood, of course, that two or more varistors may be provided in series to reduce the feedback and thus provide less limiting. Accordingly, the frequency shift signal provided to the output of transistor Q3D is substantially uniform in amplitude and rectangular in form due to the limiting action of transistor stages Q2D and Q3D.

The collector output of transistor Q3D is directly coupled to the base of driver transistor Q4D. The collector of transistor Q4D drives discriminator 201, FIG. 2, through output terminal 13 of limiter 110, lead 112, and input terminal 2 of discriminator 201, and the emitter of transistor Q4D drives the space-hold detector circuit, as described below.

The space-hold detector in limiter 110, as shown in FIG. 1, consists of resistors R15D, R23D, R24D and R25D, thermistor RT1D, varistors RV5D and RV6D, diode CR1D and capacitors C11D and C12D. The function of the space-hold detector is to make a judgement as to whether or not the frequency shift signal is being received above a minimum acceptable limit. If the received signals are below this limit, the space-hold detector is designed to block transmission through the discriminator and hold the discriminator output in spacing condition.

The output of the space-hold detector is obtained at the junction of diode CR1D and capacitor C12D and applied by way of output terminal 18 of limiter 110, lead 113, input terminal 6 of discriminator 201 and OR gate diode CR11A to the base of transistor stage Q2A. In the absence of received signals, the voltage of space-hold control lead 113 is negative due to a negative bias voltage applied by way of resistors R19D, R15D, R25D and R23D. This negative voltage causes diode CR11A to conduct, thereby holding transistor Q2A in the spacing or ON condition. During the reception of signals, the square top wave provided at the emitter of transistor Q4D is applied to capacitor C11D. When the limiting level is high enough so that the positive output voltage provided through capacitor C11D and diode CR1D overcomes the negative voltage on the space-hold control lead 113, diode CR11A no longer conducts, isolating transistor Q2A from the space-hold detector. The function of thermistor RT1D and varistors RV5D and RV6D combined with resistors R15D, R19D and R25D is to cause a variation with temperature of the negative bias component of the space-hold output voltage since the negative bias component is obtained from the voltage divider circuit in which these resistors and temperature sensitive elements are situated. This provides compensation for the variation with temperature of the positive voltage which is derived by diode CR1D. It is noted that capacitor C12D, which is connected across space-hold detector lead 113, functions to minimize the fluctuations of the space-hold voltage due to amplitude variations of the limiter output.

Discriminator 201, which consists of four parallel tuned circuits in series composed of inductors T1A, T2A, T3A and T4A and associated capacitors C1A, C2A, C3A and C4A, is driven by the collector current of transistor Q4D by way of lead 112. The secondaries of the inductors are selected in predetermined groups by means of the contacts of relay AH and relay CH, which contacts short circuit the undesired secondaries. With a short circuited secondary in one of the tuned circuits, the primary circuit resonance for that circuit is shifted sufficiently high in frequency so as to have no influence on the resonance of the remaining coils.

The tuning of the discriminator network is such that the peaks of resonances of the circuits including inductors T1A and T2A are slightly lower than the space frequencies in the $F_1$ and $F_2$ bands, respectively, and the peaks of the resonances of the circuits including the inductors T3A and T4A are slightly higher than the marked frequencies in the $F_1$ and $F_2$ frequency bands.

In the initial idle condition the secondaries of inductors T1A and T2A are short circuited through terminal 7 of discriminator 201, break contacts AH–5 and terminal 3 of the discriminator. The active elements of the discriminator in this case are inductors T3A and T4A. With these tuned circuits active any signal such as ringing, dialing or high-level noise within this range will excite the diode bridge consisting of diodes CR5A, CR6A, CR7A and CR8A. Accordingly, since these signals are present during the initiation of a call, the discriminator recognizes the beginning of a call.

When relay AH operates, as described hereinafter, the previously described short across inductors T1A and T2A is removed. In addition a short is placed across inductor T3A through terminal 10 of discriminator 201, make contacts AH–7 and terminal 11. At this time the active elements comprise the circuits including inductors T1A, T2A and T4A. Under this condition, a marking signal in the $F_2$ frequency band excites the diode bridge which includes diode CR5A and spacing signals in the $F_1$ or $F_2$ frequency band excite the diode bridge consisting of diodes CR1A through CR4A. When relay CH subsequently operates, inductor T1A is shorted through terminal 7, make contacts CH3 and terminal 9. Thus the diode bridges are then excited by the mark and space frequencies in the $F_2$ frequency band.

The amplitude outputs detected by the diode bridges are developed across load resistors R2A and R3A. Capacitors C5A and C6A are smoothing capacitors to filter out the carrier ripple after detection. Since the diode bridges are oppositely poled, a marking frequency coming into the discriminator will develop a positive voltage across the output load and a spacing signal will develop a negative polarity across the output load. Accordingly, in the initial idle condition with inductors T3A and T4A as the active elements, ringing, dialing, or high-level noise develops a positive voltage across the output load. With inductors T1A, T2A and T4A as the active elements, a marking signal in the $F_2$ frequency band develops a positive voltage across the output load. In this case, however, with inductors T1A and T2A active, a signal of spacing frequency in either the $F_1$ or $F_2$ frequency bands develops an opposing negative voltage, suppressing the positive marking voltage in the event that the marking signal is received simultaneously with the spacing signal. This precludes the interpretation of a marking idle signal from the terminating set, during the interval that the originating set is sending, as a signal present during the initiation of a call.

The signals developed across the output load are fed through the low-pass filter consisting of inductor L1A and shunting capacitor C7A to the base of transistor amplifier stage Q1A. Transistor Q1A is an emitter follower with load resistor R6A. The application of a negative spacing signal to the base of transistor Q1A provides a negative signal at the junction of load resistor R6A and resistor R9A. Conversely, a positive marking signal applied to transistor Q1A drives the voltage at the junction of resistors R6A and R9A in a positive direction. The output taken from the emitter of transistor Q1A drives the base of transistor stage Q2A through resistor R9A and OR gate diode CR9A. Through another OR gate diode CR11A, the space-hold clamp described above connects to the base input of transistor Q2A. Accordingly, a marking signal turns transistor Q2A OFF and a spacing signal or a space-hold detector signal turns transistor Q2A ON.

The collector output of transistor Q2A is connected through Zener diode CR12A and make contacts YH–2 to the base of transistor Q3A. In addition, with relay CH released, the output of transistor Q2A is also fed through Zener diode CR12A, output terminal 13 of discriminator 201, lead 202, the break contacts of contacts CH–5 (FIG. 3), input terminal 16 of timer 301, resistor R19E, and resistor R18E to positive battery, controlling the signal applied to the base of timer input transistor Q10 at the junction of resistors R19E and R18E. With this connection, a relatively positive potential is applied to the base of transistor Q10 when the collector of transistor Q2A is at the spacing ground condition. When the collector of transistor Q2A goes to the marking negative condition, Zener diode CR12A breaks down and the negative collector potential is applied to the base of transistor Q10 via lead 202.

Similarly, a marking signal produces a negative voltage and a spacing signal produces a positive voltage at the base of transistor Q3A via make contacts YH–2. Accordingly, with relay YH operated, when the base of transistor Q3A goes negative it conducts, causing current to flow from ground through the emitter-to-collector path. This removes the negative potential applied to the collector of transistor Q3A through resistor R16A.

When relay CH and relay YH operate, as described hereinafter, the reception of a spacing signal cuts transistor Q3A OFF and its negative collector potential is fed through resistor R19A, output terminal 14 of discriminator 201, lead 203, and the make contacts of contacts CH–5, input terminal 16 of timer 301 and resistor R19E to the base of timer input transistor Q10. Accordingly, following the operation of relay CH and relay YH the timer is connected to the collector of transistor Q3A which provides a logical inversion. At this point, the application of a negative voltage to the timer corresponds to a spacing condition and a positive voltage corresponds to a marking condition. It is also noted that the collector output of transistor Q3A is fed through output terminal 4 of discriminator 201, lead 204, and resistor R1B to the grid of tube V2B in the coupling unit. The operation of the coupling unit will be described hereinafter.

The timer circuit performs several different functions depending upon the sequence of the subscriber call. In the initial condition the space-hold detector circuit maintains transistor Q2A in the spacing conducting condition connecting ground over the path traced above to the base of transistor Q10 and then through resistor R18E to battery so that the base voltage is positive. The emitter of transistor Q10 is biased relatively negative to the base by the voltage divider comprising resistors R16E and R17E whereby transistor Q10 is turned OFF and a negative potential is applied to the base of transistor Q11 via resistor R15E. Accordingly, transistor Q11 is conducting, rendering the emitter potential negative. This negative potential is applied through resistor R11E forward biasing diode CR2E. With diode CR2E conducting, the negative potential is applied through break contacts CH–4 to timing capacitor C2E and through break contacts AH–6, the break contacts of contacts SH–3 to the base of transistor Q12. This renders transistor Q12 nonconductive whereby the positive potential applied by way of resistors R6E and R5E to the base of transistor Q14 renders the latter transistor nonconductive. The resultant positive-going emitter potential of transistor Q14 is applied to the base of transistor Q15 rendering it nonconductive.

As long as transistor Q2A is conducting, diode CR2E is maintained forward biased, the negative charge is maintained on capacitor C2E and transistor Q12 is maintained nonconductive. When a call is initiated by a subscriber or the subscriber's line is rung, a simulated marking condition is applied to transistor Q2A, as previously described, rendering it nonconductive, whereby a negative-going potential is applied to the base of transistor Q10. This negative-going signal causes transistor Q10 to conduct, driving the potential at the collector in a positive direction. The application of the positive potential to the base of transistor Q11 turns the transistor OFF whereby the positive potential applied through resistors R13E and R11E back biases diode CR2E, causing diode CR2E to cease conducting.

When diode CR2E ceases to conduct, a charging path is established for capacitor C2E toward positive battery through resistor R10E and through resistor R7E by way of the previously mentioned contacts of relays SH and AH. The capacitor charges rendering the base of transistor Q12 positive after an interval of approximately four-tenths of a second. This turns ON transistor Q12 and its negative-going collector potential applied to the base of transistor Q14 by way of resistor R5E turns ON transistor Q14. The negative-going emitter potential of transistor Q14 is then applied to the base of transistor Q15 turning the latter transistor ON.

When transistor Q15 conducts, ground is applied through its emitter-to-collector path, output terminal 17 of timer 301, and lead 303 to the relay control circuit shown in FIG. 4 operating relay AH, as described hereinafter. When relay AH operates, the previously described paths connecting diode CR2E and capacitor C2E to the base of transistor Q12 through break contacts AH–6 are opened, and capacitor C3E, which was previously charged negatively through the break contacts of contacts AH–3, is now extended to the base of transistor Q12 through the make contacts of contacts AH–3, the break contacts of contacts MH–3 and the break contacts of contacts SH–3. Capacitor C3E now proceeds to charge toward positive battery through resistor R7E rendering transistor Q12 conductive after approximately two-tenths of a second. This, in turn, renders transistors Q14 and Q15 conductive and the consequent application of ground to lead 303 operates relay MH, as described hereinafter.

Relay MH operated disconnects capacitor C3E from the base of transistor Q12 and reconnects diode CR2E and capacitor C2E to the base of transistor Q12 through the make contacts of contacts MH–3 which contacts shunt break contacts AH–6 in the previously-described path extending the base of transistor Q12 to diode CR2E and capacitor C2E.

The operation of relay AH, as previously described, sets discriminator 201 to respond to the reception of marking in the $F_2$ frequency band and spacing in the $F_1$ or $F_2$ frequency bands whereby a marking signal is applied to transistor Q2A in response to the reception of $F_2$ marking in the absence of $F_1$ or $F_2$ spacing. When the marking signal is received, transistor Q2A is turned OFF and the resultant negative collector potential is applied to the base of transistor Q10, as previously described. Transistor Q10 is thus rendered conductive, turning OFF transistor Q11 whereby diode CR2E is back biased. Accordingly, capacitor C2E again charges to positive battery through resistors R7E and R10E, turning ON transistor Q12 after approximately four-tenths of a second. This renders transistors Q14 and Q15 conductive, in turn, and the consequent application of ground to lead 303 operates relay CH, as described hereinafter.

As previously described, relay CH operated renders discriminator 201 responsive to the marking and spacing signals in the $F_2$ frequency band and transfers the base connection of transistor Q10 from the collector of transistor Q2A to the collector of transistor Q3A whereby timer 301 now monitors for spacing signals. In addition, relay CH operated opens the path through break contacts CH–4 connecting the base of transistor Q12 to capacitor C2E. Relay CH operated also connects timer capacitor C1E to the base of transistor Q12 through the make contacts of contacts CH–7. In addition, relay CH operated operates relay YH, as described hereinafter, completing a path through make contacts YH–5 shunting the break contacts of contacts SH–3 in the path extending the base of transistor Q12 to diode CR2E. Relay YH operated also extends the output of transistor Q2A to the input of transistor Q3A, as previously described.

Timer 301 is now set to monitor for the disconnect signal which constitutes a spacing signal having a duration of at least one second. During the communication interval, the telegraph marking and spacing signals received by the discriminator alternately renders diode CR2E conductive and nonconductive, whereby capacitor C1E is alternately discharged by diode CR2E and charged through resistors R7E and R10E. When the prolonged disconnect signal is received diode CR2E is rendered nonconductive and capacitor C1E is charged sufficiently to render transistor Q12 conductive. This, in turn, turns ON transistors Q14 and Q15 and the application of ground to lead 303 operates relay SH, as described hereinafter, initiating the disconnect sequence. The operation of relay SH and the subsequent release of relay YH then disconnects diode CR2E from the base of transistor Q12.

Figure 2:
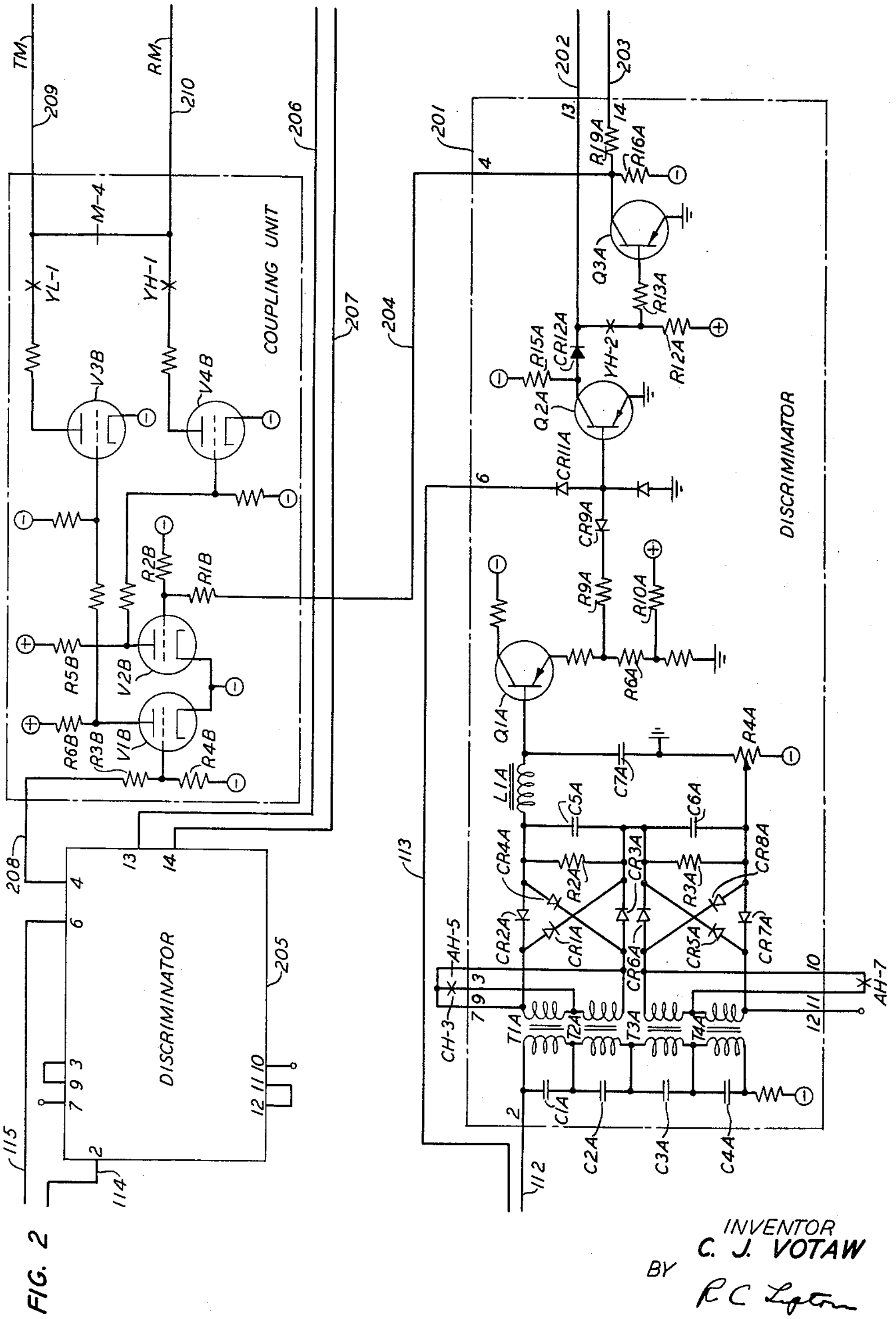
Figure 3:
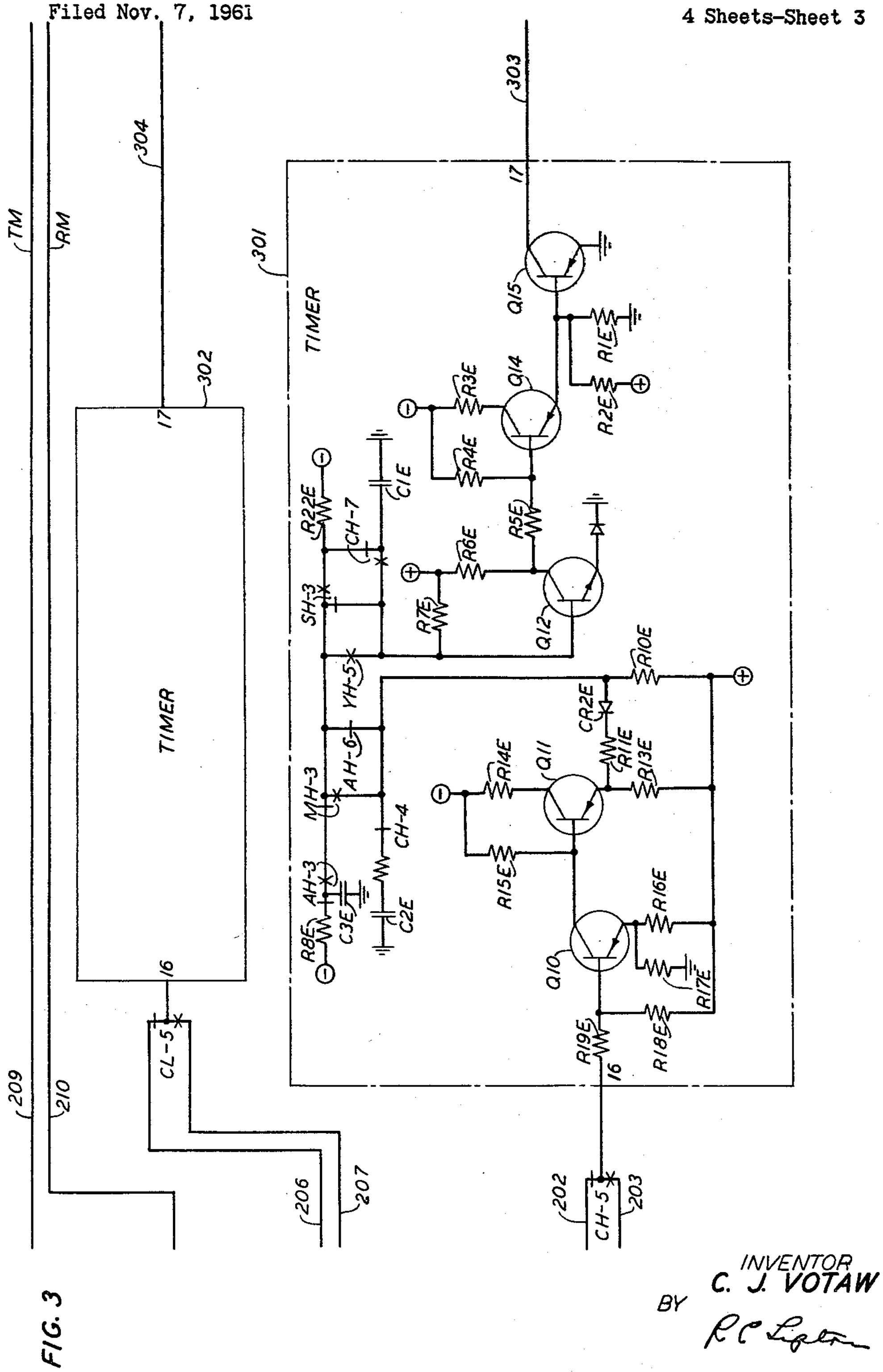

Returning now to the application of signals to the grid of tube V2B in the coupling unit shown in FIG. 2, it is recalled that the reception of marking and spacing signals provide positive-going and negative-going potentials at the collector of transistor Q3A in discriminator 201, which potentials are applied through lead 204 to the grid of tube V2B. The application of a negative-going spacing signal to the grid of tube V2B turns the tube OFF whereby a positive potential is applied through resistor R5B to the grid of tube V4B, rendering the latter tube conductive. Conversely, a positive-going marking signal turns ON tube V2B and the resultant negative-going plate potential is applied to the grid of tube V4B, turning the latter tube OFF. Assuming relay YH is operating, negative current spacing pulses and no current marking pulses are thus applied to lead 210 and in the event that relay M is released, to lead 209 through the break contacts M–4. Assuming a cord circuit is inserted in jack 404, FIG. 4, the above-described marking and spacing pulses on lead 210 are applied through the ring lead of jack 404 to amplifier 408 where they are converted to the conventional current marking and no current spacing pulses for application to select magnet 409 of a conventional teletypewriter, generally indicated by block 410. Similarly, with a cord circuit inserted in jack 403, amplifier 405 converts the marking and spacing signals applied in lead 209 and the ring lead of jack 403 to signals suitable for select magnet 406 of teletypewriter 407.

The signals derived from limiter 111, which, as previously described, is substantially identical to limiter 110, are provided from output terminal 13 through lead 114 to input terminal 2 of discriminator 205. Similarly, the space-hold control signal is provided at output terminal 18 of limiter 111 and applied through lead 115 to input terminal 6 of discriminator 205. Discriminator 205 is substantially identical to discriminator 201. It is noted, however, that terminal 3 is connected to terminal 9 and terminal 11 is connected to terminal 12. Accordingly, the secondaries of the inductors corresponding to inductors T2A and T4A in discriminator 201 are short circuited in discriminator 205 whereby the discriminator is responsive to marking and spacing signals in the $F_1$ frequency band. Output terminals 13 and 14 of discriminator 205 are connected through lead 206 and the break contacts of contacts CL–5 and lead 207 and the make contacts of contacts CL–5 to input terminal 16 of timer 302.

Timer 302 is substantially identical to timer 301 with the exception that the relay contacts in timer 301 terminating with the letter "H" terminating with the letter "L" in timer 302. The output terminal 17 of timer 302 then extends through lead 304 to its associated relay control circuit in FIG. 4. Output terminal 4 of discriminator 205 extends by way of lead 208 to the grid of tube V1B. Accordingly, tube V1B is turned ON and turned OFF by mark and space signals, respectively. When tube V1B turns ON, in response to a marking signal, tube V3B turns OFF and, with relay YL operated, a no current marking signal is applied to lead 209. Conversely, a spacing signal turns tube V3B ON applying a negative current spacing signal to lead 209.

Assuming now that it is desired to monitor the subscriber line, a cord circuit is inserted in jack 403 and a cord circuit is inserted in jack 404 to monitor signals in the $F_1$ frequency band on teletypewriter 407 and monitor signals in the $F_2$ frequency band on teletypewriter 410. This operates relays R and M through the associated sleeve leads and relays R and M operated complete obvious operating paths for relay A. Relay A operated locks through its own make contacts and extends the input lead to pad 103, as previously described. Relay M operated isolates line 209 from line 210 whereby the signals in the $F_1$ frequency band are applied to lead 209 and the signals in the $F_2$ frequency band are applied to lead 210.

In the event that it is desired to monitor the $F_1$ and $F_2$ channels on teletypewritter 407, the insertion of the cord circuit in jack 403 operates relay R which, in turn, operates relay A. Since relay M is released, however, the plate of tube V4B will be extended to lead 209 through break contacts M–4 whereby the signals in the $F_1$ and $F_2$ frequency bands are applied to lead 209.

With relay A operated and relays CH and AH released, discriminator 201 together with timer 301 monitors for the initiation of the call. When ringing or dial tone is received, timer 301 is activated, as previously described, and the applicator of ground to lead 303 is extended through the break contacts of contacts AH–8, the winding of relay AH and the break contacts of contacts SH–7 to negative battery, operating relay AH which locks through the make contacts of contacts AH–8 and make contacts A–10. Relay AH operated sets discriminator 201 to monitor for the marking signal in the $F_2$ frequency band, as previously described. In addition, relay AH operated recycles timer 301 and, as previously described, ground is reapplied to lead 303 and extended through make contacts AH–2, the break contacts of contacts MH–8 and the winding of relay MH to negative battery, operating relay MH which locks through the make contacts of contacts MH–8 and make contacts AH–1. The operation of relay MH again recycles timer 301 and sets the timer to monitor for the reception of the marking signal.

The subsequent reception of the marking signal reapplies ground to lead 303, as previously described, which ground is extended through make contacts MH–1, the break contacts of contacts CH–8 and the winding of relay CH, operating relay CH which locks through the make contacts of contacts CH–8 and make contacts AH–1. Relay CH operated opens the path connecting filter 105 to input terminal 7 of limiter 110 through break contacts CH–10, arranges discriminator 201 to respond to marking and spacing signals in the $F_2$ frequency band and connects the base of timer transistor Q10 to the collector of transistor Q3A whereby timer 301 monitors for the reception of spacing signals, as previously described. Relay CH operated also completes an operating path for relay YH through break contacts SH–5 and make contacts CH–2. With relay YH operated, the plate of tube V4B is extended to lead 210 through make contacts YH–1 whereby teletypewriter 410 is enabled to monitor the signals in the $F_2$ frequency band. In addition, relay YH operated completes an obvious energizing path for lamp 401 indicating that the teletypewriter is receiving signals in the $F_2$ frequency band.

Returning now to relay CH operated, an operating path is completed for relay AL through make contacts A–11, make contacts CH–1, the break contacts of contacts AL–8, the winding of relay AL and the break contacts of contacts SL–7 to negative battery operating relay AL which locks through the make contacts of contacts AL–8 shunting make contacts CH–1. Relay AL operated extends the incoming signals to limiter 111, as previously described, and recycles timer 302 in substantially the same manner as the operating of relay AH recycles timer 301. Accordingly, ground is applied to lead 304 after approximately two-tenths of a second, which ground is extended through make contacts AL–2, the break contacts of contacts ML–8 and the winding of relay ML to negative battery, operating relay ML which locks through the make contacts of contacts ML–8, and make contacts AL–1. With relay ML operated, timer 302 recycles and monitors for the reception of a marking signal in the same manner that these operations are provided by timer 301 in response to the operation of relay MH.

It is recalled that during the connect sequence a marking signal in the $F_1$ frequency band is now being transmitted. Timer 302 responds to the marking signal by reapplying ground to lead 304 which ground is extended through make contacts ML–1 and the break contacts of contacts CL–8 to the winding of relay CL, operating the relay which locks through the make contacts of contacts CL–8 and make contacts AL–1. Relay CL operated transfers input terminal 16 of timer 302 to output terminal 14 of discriminator 205 and recycles timer 302 to monitor for spacing signals in substantially the same manner as the operation of relay CH recycles timer 301 to monitor for spacing signals. Relay CL operated also completes an operating path for relay YL through the break contacts of contacts SL–5 and make contacts CL–2. Relay YL operated completes an obvious energizing path for lamp 402 indicating that the teletypewriter is monitoring signals in the $F_1$ frequency band. In addition, relay YL operated connects the plate of tube V3B to lead 209 to make contacts YL–1 whereby signals in the $F_1$ frequency band are received by teletypewriter 407. The circuit is now suitably arranged to monitor for signals in both the $F_1$ and $F_2$ frequency bands and this condition will be maintained until one of the subscribers transmits a disconnect signal.

At the termination of the message interval one of the subscribers sends a disconnect signal comprising a spacing signal having the duration of approximately one second. As disclosed in the above-mentioned application of T. L. Doktor et al., the other subscriber responds to the disconnect signal by returning a one-second spacing signal and restoring the line to the on-hook condition. Assuming that the originating set sends the first disconnect signal, timer 302 responds to the one-second spacing signal in the $F_1$ frequency band by applying ground to lead 304. This ground is extended to the winding of relay SL through make contacts ML–1, make contacts YL–8 and the break contacts of contacts SL–6 operating relay SL which locks through the make contacts of contacts SL–6 and make contacts AL–1. Relay SL operated transfers the operating path for relay YL through the make contacts of contacts SL–5 and make contacts CH–12. In addition, relay SL operated shunts the incoming signal applied across pad 107 through make contacts SL–12 whereby incoming signals are no longer applied to limiter 111.

The subsequent reception of the disconnect signal from the terminating station applies ground to output terminal 17 of timer 301 which ground is extended to the winding of relay SH through make contacts MH–1, make contacts YH–8 and the break contacts of contacts SH–6 operating relay SH which locks through the make contacts of contacts SH–6 and the make contacts of contacts CL–12. Relay SH operated extends battery to the base of transistor Q12 through resistor R22E, the make contacts of contacts SH–3 and make contacts YH–5, recycling timer 301. Relay SH operated also applies a shunt through make contacts SH–12 across the input circuit applied to pad 103, thereby precluding the application of signals to limiter 110. In addition, relay SH operated opens the previously described operating path for relay YH and relay YH released de-energizes lamp 401 and disconnects the teletypewriter from the plate of tube V4B. In addition, relay YH operated applies shunting ground to the winding of relay AH through break contacts YH–6 and the make contacts of contacts SH–7 releasing relay AH. With relay AH released, the previously described locking paths for relays MH and CH are opened, releasing these relays. In addition, relay AH released reconnects terminating resistor AH–1 across hybrid TH through the break contacts of contacts A–8.

The release of relay CH opens the previously described operating path for relay YL and relay YL released extinguishes lamp 402 and disconnects teletypewriter 407 from the plate of the tube V3B. In addition, relay YL released extends shunting ground to the winding of relay AL through the break contacts YL–6 and the make contacts of contact SL–7, releasing relay AL.

Relay AL released reconnects terminating resistor AL1 across hybrid TH by way of the break contacts of contacts AL–5. In addition, relay AL released opens the previously described locking paths for relays CL, ML and SL and these relays release. The release of relay CL transfers the locking path of relay SH through the break contacts of contact CL–12 to make contact AH–1. Since relay AH is released, however, the locking path for relay SH is open and the latter relay releases.

With the release of relay SH the monitoring circuit is restored to the initial idle condition with only relays M, R and A operated. The circuit is now prepared to look for the initiation of another call reconnecting the teletypewriters when a new call is made.

In the event that the cord circuits are removed from the jacks the opening of the associated sleeve leads releases relays M and R. With relays M and R released, an energizing path for thermal relay TM is established through break contacts R–11, break contacts M–7 and make contacts A–1. Accordingly, after a predetermined delay, relay TM is energized to close make contact TM–1 shunting relay A. The consequent release of relay A opens the energizing path for relay TM whereby all of the relays in the monitoring circuit are released.

In the event that a disconnect signal is received from the originating station but no disconnect signal is received from the terminating station, relay SL operates in the same manner as previously described. With relay SL operated, an energizing path for relay TM is extended through make contacts SL–9 operating relay TM after a predetermined delay. The operation of relay TM releases relay A, as previously described, and with relay A released the operating paths of relays AH and AL are open, releasing these relays. The release of relay AH reconnects terminating resistor AH1 and releases relays MH and CH, as previously described. With relay CH released, the operating path for relay YH is open and the consequent release of relay YH disconnects teletypewriter 410 and extinguishes lamp 401, as previously described.

The release of relay AL reconnects resistor AL1 across hybrid TH and releases relays CL and ML, as previously described. In addition, the release of relay AL opens the previously described locking path for relay SL and relay SL released opens the energizing path for relay TM. The release of relay TM removes the shunting ground around relay A allowing this relay to reoperate. The release of relay CL releases relay YL extinguishing lamp 402 and disconnecting teletypewriter 407, as previously described.

In the event that the terminating station sends the disconnect signal and no disconnect signal is received from the originating station relay SH operates, as previously described. This releases relay YH which, in turn, releases relay AH and relay AH releases MH and CH in the same manner as previously described. In addition, relay SH operated completes an energizing path for relay TM through make contacts SH–9 and the consequent operation of relay TM releases relay A which, in turn, releases relay AL, as previously described. The release of relay AL releases relays ML and CL and relay CL released releases relay YL. In addition, with relay CL released, relay SH releases, as previously described, opening the previously described energizing path for relay TM. The subsequent release of relay TM removes the shunt around relay A whereby relay A operates. The monitoring circuit is thus restored to the initial condition wherein relays R, M and A are operated and the circuit is looking for the initiation of a new call.

Although a specific embodiment of the invention has been shown and described, it will be understood that various modifications may be made without departing from the spirit of this invention and within the scope of the appended claims.

What is claimed is:

1. A system for monitoring a first and second subchannel of frequency-shift signals comprising first discriminating means responsive to signals in said first and second subchannels, normally disabled second discriminating means effective in the absence of signals in said first subchannel and responsive to signals in said second subchannel, normally disabled third discriminating means solely responsive to signals in said second subchannel, means for monitoring the output of said third discriminating means, means responsive to said responsive first discriminating means for enabling said second discriminating means, and means responsive to said responsive second discriminating means for enabling said third discriminating means.

2. A system for monitoring a first and second subchannel of frequency-shift signals comprising, first discriminating means responsive to signals in said first and second subchannels, normally disabled second discriminating means effective in the absence of signals in said first subchannel and responsive to signals in said second subchannel, normally disabled third discriminating means solely responsive to signals in said second subchannel, normally disabled fourth discriminating means solely responsive to signals in said first subchannel, means for monitoring the output of said third discriminating means, means for monitoring the output of said fourth discriminating means, means responsive to said responsive first discriminating means for enabling said second discriminating means, means responsive to said responsive second discriminating means for enabling said third discriminating means, and other means responsive to said responsive second discriminating means for enabling said fourth discriminating means.

3. A system for monitoring a first and second subchannel of two condition frequency-shift signals comprising detecting means, first filter means responsive to signals of one of said two conditions in said first subchannel for activating said detecting means, second filter means responsive to signals of the other of said conditions in said first subchannel for rendering said detecting means unresponsive to said first filter means, third filter means responsive to signals of said other condition in said second subchannel for rendering said detecting means unresponsive to said first filter means, switching means responsive to said activated detecting means for rendering said third filtering means ineffective, and means enabled by said switching means for monitoring the output of said detecting means.

4. In a system for monitoring a first and second subchannel of signals, a normally disabled first discriminator means responsive to signals in said first subchannel, and a second discriminator means, said second discriminator means including signal detecting means responsive to signals in said second subchannel, a normally disabled guard circuit responsive to signals in said first subchannel for rendering said signal detecting means unresponsive to signals, first operable means responsive to said signal detecting means for enabling said guard circuit, and second operable means enabled by said first operable means and responsive to said signal detecting means for disabling said guard circuit and enabling said first discriminator means.

5. In a system for monitoring a first and second subchannel of signals, a normally disabled first discriminator means responsive to signals in said first subchannel, and a second discriminator means, said second discriminator means including first signal detector means responsive to signals in said first subchannel, second signal detecting means responsive to signals in said second subchannel, a normally disabled guard circuit responsive to signals in said first subchannel for rendering said second signal detecting means unresponsive to signals, first operable means responsive to said first signal detecting means and said second signal detecting means for disabling said first signal detecting means and enabling said guard circuit, and second operable means enabled by said first operable means and responsive to said second signal detecting means for disabling said guard circuit and enabling said first discriminator means.

6. A system for monitoring a first and second subchannel of two-condition frequency-shift signals comprising, detecting means, first filter means responsive to signals of one of said two conditions in said first subchannel for activating said detecting means, normally disabled second filter means responsive to signals of the other of said conditions in said first subchannel for rendering said detecting means unresponsive to said first filter means, normally disabled third filter means responsive to signals of said other condition in said second subchannel for rendering said detecting means unresponsive to said first filter means, operable means responsive to said activated detecting means for enabling said second and third filter means, switching means conditioned by said operable means and responsive to said activated detecting means for rendering said third filter means ineffective, and means enabled by said switching means for monitoring the output of said detecting means.

7. A system for monitoring a first and second subchannel of two-condition frequency-shift signals comprising, detecting means, first filter means responsive to signals of one of said two conditions in said first subchannel for activating said detecting means, second filter means responsive to signals of said one condition in said second subchannel for activating said detecting means, normally disabled third filter means responsive to signals of the other of said conditions in said first subchannel for rendering said detecting means unresponsive to said first filter means, normally disabled fourth filter means responsive to signals of said other condition in said second subchannel for rendering said detecting means unresponsive to said first filter means, operable means responsive to said activated detecting means for enabling said third and fourth filter means and rendering said second filter means ineffective, switching means conditioned by said operable means and responsive to said activated detecting means for rendering said fourth filter means ineffective, and means enabled by said switching means for monitoring the output of said detecting means.

References Cited in the file of this patent

UNITED STATES PATENTS

| | | |
|---|---|---|
| 2,520,308 | Eldredge | Aug. 29, 1950 |
| 2,989,591 | Heidester | June 20, 1961 |
| 3,046,340 | Stoffels | July 24, 1962 |